Figure 1:
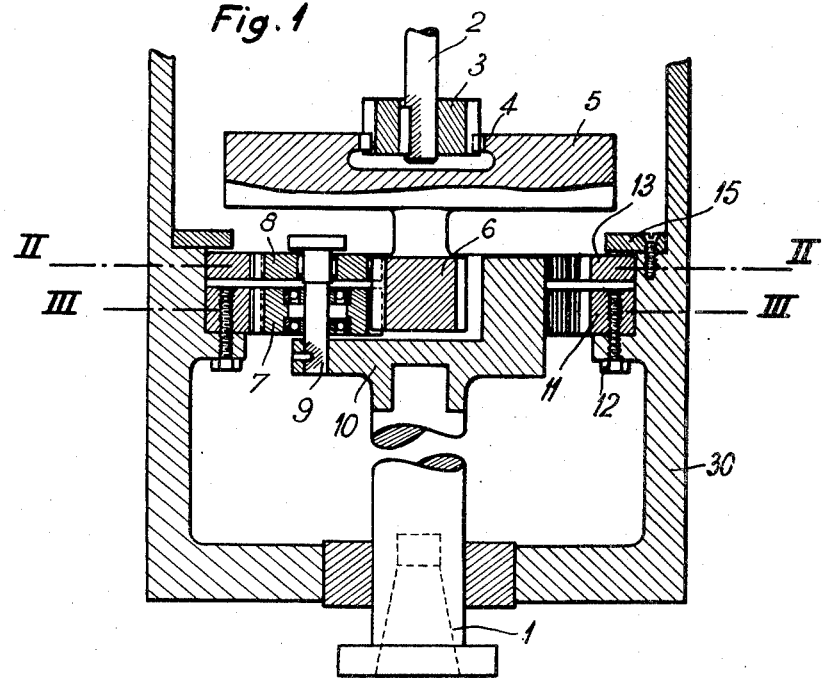

Aug. 13, 1957     G. BERTHIEZ     2,802,377
DRIVING OF SPINDLES OF MACHINE TOOLS
Filed June 9, 1954

INVENTOR
Gilbert Berthiez

By George H. Corey

ATTORNEY

United States Patent Office 2,802,377
Patented Aug. 13, 1957

2,802,377

DRIVING OF SPINDLES OF MACHINE TOOLS

Gilbert Berthiez, Le Mont-de-Po-Lamorlaye, France, assignor to Société Anonyme des Anciens Etablissements Charles Berthiez, Paris, France Application June 9, 1954, Serial No. 435,575

Claims priority, application France April 9, 1954

7 Claims. (Cl. 74—801)

For driving the spindles of machine tools and particularly for driving the spindles of milling or boring machines it has already been proposed to arrange between the driving shaft and the spindle transmission devices which consist of a train of planet gears and a regulator fly wheel.

However, owing to the play which exists between the elements of the transmission device, there occurs in these devices, in both directions of running, a recoil or rebound of the tool carried by the spindle, which leads to irregularities in machining.

This play makes itself felt in milling a discontinuous surface by the abrupt variation of the working force, which in transition from one portion of the surface to the other may vary from zero to a maximum.

On the other hand, when there are irregularities in the profile of the meshing gear teeth of the transmission mechanism these faults are periodically reproduced and show themselves by the appearance of periodical faults in the machined surface.

The present invention has for its object to provide a driving device for the spindle of machine tools wherein the above mentioned difficulties are overcome.

The invention has the following features to be considered separately or in combination:

(1) Between the driving shaft and the spindle are interposed, apart from the usual fly wheel, a first planet gear train comprising a central pinion, a first set of planet wheels meshing with this central pinion, and a fixed outer crown wheel, toothed internally, with which these planet wheels are in mesh. A second planet gear train is provided comprising the same central pinion, a second set of planet wheels meshing with this central pinion and mounted on the same axles as the planet wheels of the first gear train, and an outer crown wheel, toothed internally in mesh with the second set of planet wheels the second internally toothed crown wheel being supported for slight rotational movement under the action of a pusher pawl which is in engagement with the second toothed crown wheel and urges this wheel in a direction which would produce rotation of the spindle opposite to the selected rotational movement of the spindle.

(2) The pusher pawl is subject to the action of one or the other of two springs acting in opposite directions, the choice of the spring which is to act on the pusher pawl being determined by an off-setting member which puts one or the other of the springs under load, and which is operated according to the desired direction of movement of the spindle.

(3) The number of teeth of the outer internally toothed crown wheel of each train is prime to the number of teeth of the planet wheels and the axes of these planet wheels are distributed in a slightly irregular fashion about the axis of the central pinion.

Figure 2:
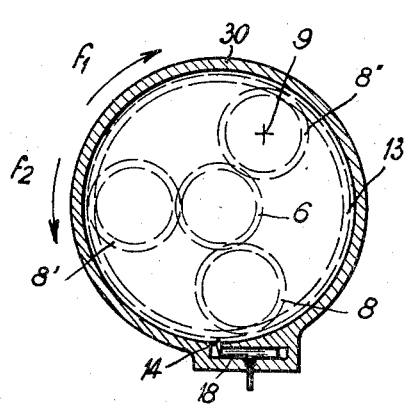
Figure 3:
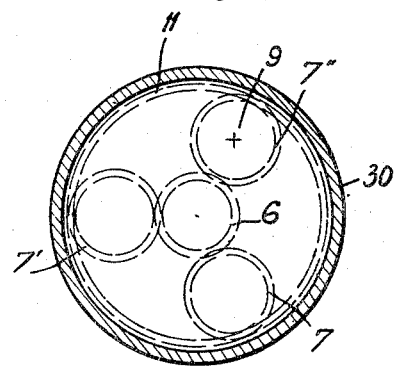
Figure 4:
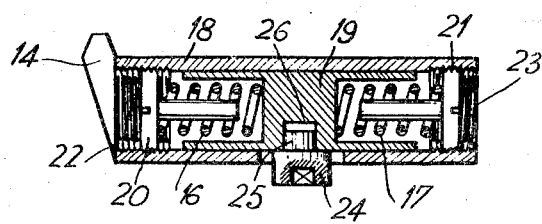

Other features and advantages of the present invention will be apparent from the following description with reference to the accompanying drawings in which:

Figure 1 is an axial section of a driving device according to the invention for the spindle of a machine tool, Figure 2 is a section on the line II—II of Figure 1, Figure 3 is a section on the line III—III of Figure 1, and Figure 4 is an axial section on a larger scale of the pusher pawl used in conjunction with the internally toothed crown wheel of one of the two planet gear trains.

As will be seen in the drawing, the spindle 1 of the machine tool, into which can be fitted a suitable tool, for example a milling tool or a boring tool, is driven by a shaft 2 which may be connected directly with a motor, or with a gear box, by the intermediary of a transmission device about to be described.

At the end of the driving shaft 2 is keyed a pinion 3 which meshes in clutching engagement with internal clutch teeth 4 provided in a recess of a regulator flywheel 5. The fly wheel is integral with a central pinion 6 which meshes with two sets of planet wheels, that is, with the planet wheels 7, 7' and 7" on the one hand, and with the planet wheels 8, 8' and 8" on the other hand.

The corresponding planet wheels of these two sets of planet wheels are mounted for rotation freely upon the common axles 9 carried by a planet carrier 10 which is integral with or otherwise operatively connected to the spindle 1.

The first set of planet wheels 7, 7', 7" forming part of the first planet gear train meshes, moreover, with an outer crown wheel 11 toothed internally this crown wheel being fixed to the housing structure 30, such as the spindle headstock on which it may be secured, for example, by means of screws 12.

The second set of planet wheels 8, 8' and 8", which forms part of the second planet gear train, meshes with an outer crown wheel 13 toothed internally which, however, instead of being fixed to the component of the machine, such as the head stock, as is the toothed crown 11, is supported so as to be capable of a slight rotational movement with respect to such machine component or head stock under the action of a pusher pawl 14 engaging the crown wheel 13.

The toothed crown 13 can be held against movement in the direction parallel to the axis of the crown wheels by a circular flange 15 screwed, for example, on a shoulder of the head stock 30.

The pusher action of the pawl 14 is brought about by means of a spring which, for a predetermined direction of rotation of the spindle, may be the spring 16, and for the opposite direction the spring 17 (see Figure 4). According to the direction of rotation of the spindle either the spring 16 or the spring 17 will be compressed in such a manner that the thrust of the pawl 14 acts in the direction to produce rotation of the crown wheel 13 opposite to that which, if continued, would produce the desired rotational movement of the spindle.

To this end, as shown in Figure 4, this pawl 14 may be mounted at the end of a cylinder 18 in which is slidable an abutment piece 19 against which the ends of the springs 16 and 17 bear, the other ends of which discs abut against the discs 20 and 21, the position of which discs can be adjusted by screwing them in the tapped ends 22 and 23 of the tube 18. The position of the slidable piece 19 relative to the cylinder 18 may be controlled from outside by means of a dog 24. This dog comprises a pin 25 adapted to act in a recess 26 of the piece 19 in such manner as to put load either on the spring 16 (position in Figure 4) or on the spring 17 (in the case when the pin 25 is moved into contact with the right hand side wall of the recess 26).

Assuming the pin 25 to occupy the position shown in Figure 4, in which position it is the spring 16 which is under compression, the pusher pawl 14 will act on the crown 13 so as to make it turn in the direction of the arrow $f_1$, Fig. 2.

Assuming, moreover, that the pinion 6 is stationary, the action of the spring 16 on the crown 13 will be such as to rotate the spindle 1 in the same direction, that is to say in the direction of the arrow $f_1$.

In these circumstances, when the spindle 1 is being driven in the direction of the arrow $f_2$, the action of the spring 16 on the crown wheel 13 will produce a restraining force which will take up the play between the gear teeth and which will prevent the recoil or rebound of the tool consequent to the existence of this play. Thus the irregularities in the machining of the piece will be obviated.

When now the spindle 1 thus is to be rotated counter-clockwise in the direction of the arrow $f_2$, Fig. 2, the axles 9 and the planet wheel carrier 10 also moving counter-clockwise about the axis of the spindle, the pinion 6 also is required to be rotated by the shaft 2 in the direction of the arrow $f_2$. The action of the spring 16 on the crown wheel 13, however, tends to produce movement of this crown wheel in the clockwise direction of arrow $f_1$ and tends to produce movement of the axles 9 and of the planet wheels 7, 7', 7" clockwise about the axis of the spindle. Normally, as the pinion 6 drives, the forward profile of a driving tooth of the pinion 6 is in engagement with the trailing profile of a driven tooth of the planet wheels 7, 7', 7" for effecting the desired counter-clockwise movement of the axles and the planet wheels about the spindle axis. Upon variation, for example, of the force of the work piece resisting the tool and reacting on the spindle, if the spindle and the planet wheel carrier and the planet wheels should start to run slightly ahead of the rotation of the pinion 6 and thereby carry the driven tooth of the planet wheel out of engagement with the driving tooth of the pinion 6, the spring 16 acting on the crown wheel 13 will oppose such running ahead movement of the planet wheel carrier and the planet wheels, so that the trailing profile of the driven planet wheel tooth will remain in engagement with the forward profile of the driving tooth of the pinion 6. Thus, chatter and irregularities in the machining of the work piece will be obviated.

When it is desired to effect normal rotation of the spindle in the reverse direction, that is to say, in the direction of the arrow $f_1$, the spring 17 similarly may be caused to act through the pawl 14 tending to produce movement of the crown wheel 13 in the direction of the arrow $f_2$. The opposing action described with respect to the spring 16 is secured by the action of the spring 17 for this opposite direction of rotation of the spindle.

Since the pawl 14 is in engagement with the crown wheel 13, the springs 16, 17 may be selectively compressed by effecting movement of the abutment piece 19 in the proper direction, that is, toward the left or toward the right in Figs. 2 and 4. In order to accomplish such movement the pin 25 of the rotatable dog 24, which is eccentric to the axis of the dog and is disposed in the recess 26 in the piece 19, may be brought into engagement selectively with the left hand and the right hand wall of the recess 26, Fig. 4. In the position shown in Fig. 4, the spring 16 is compressed for effecting the slight rotation of the crown wheel 13 in the clockwise direction, Fig. 2. By rotation of the dog 24 on its vertical axis, either by hand or, for example, by suitable operative connection between the dog and a member which controls the rotation of the spindle in one or the other direction of rotation, the pin 25 may be moved from the position of engagement with the left hand wall to the position in which it engages the right hand wall of the recess 26, thereby relieving the compression of the spring 16 and compressing the spring 17 to secure the operation of the device when the spindle rotates in the direction of the arrow $f_1$.

Another feature of the invention relates to the number of teeth in the crown wheel relative to the number of teeth in the planet wheels. In order to avoid repeated engagement during continued operation of the machine of the same tooth of a planet wheel with the same teeth of the crown wheel upon completion of each rotation of the planet wheel rolling in engagement with the teeth of the crown wheel, the number of teeth of the crown wheel 11 is made "prime" to the number of teeth of the planet wheel 7, 7', 7", that is to say, the number of teeth of the crown wheel is not an even multiple of the number of teeth of the planet wheel. If, for example, each of the planet wheels has 23 teeth and the fixed crown wheel 11 has 64 teeth, the number 64 being not an even multiple of the number 23, it will be clear that a given tooth of the planet wheel, starting from engagement with a given tooth of the crown wheel, upon completion of its first and second rotations will not again reach the given tooth of the crown wheel 11. Moreover, upon completion of its third rotation this given tooth of the planet wheel will have moved beyond the given tooth or the crown wheel. Thus, the given tooth of the planet wheel in the continued rotation thereof will come into engagement with different teeth of the crown wheel and will not reach the given tooth of the crown wheel for a very large number of revolutions of the planet wheel. The effect of any irregularities in the machining of the teeth of the meshing wheels and wear of the teeth of these wheels will be distributed along the circumference of the crown wheel and periodic repetition of the variation of the driving action which would result in irregularities in machining will be avoided.

In order further to effect the distribution of the engagement of the teeth of the planet wheels with the crown wheels so as to reduce or eliminate faults in machining, the axles 9 of the three planet wheels 7, 7', 7", instead of being disposed regularly 120° apart about the axis of the planet wheel carrier, may be distributed, for example, at angles of 122° 55' 36", 118° 32' 12" and 118° 32' 12" about the common axis of the planet wheel carrier and the pinion 6. It will be understood that the action above referred to which prevents engagement of the same tooth of the planet wheel with the same teeth of the crown wheel, which would occur were the number of the teeth of the crown wheel an even multiple of the number of teeth of the planet wheel, is aided by the uneven angular disposition of the axles of the planet wheels because the given tooth of each planet wheel will be in engagement initially with a given tooth of the crown wheel which is not in a symmetrical or evenly spaced relation to the other given teeth of the crown wheel that are in engagement with the respective given teeth of the other planet wheels. Such ratio relations and the disposition and arrangement of the gear wheels eliminating continued periodic reproduction of faults in machining supplements the action above described secured by the spring pressed pawl 14 which avoids the effect of play or back-lash resulting in irregularities and chatter.

I claim:

1. Device for driving the spindle of a machine tool, comprising a driving shaft, a first planet gear train comprising a central pinion operatively connected to said driving shaft to be driven thereby a set of planet wheels of said first train respectively rotatable on axles and meshing with said central pinion, a fixed outer crown wheel of said first train co-axial with said central pinion and toothed internally with which said planet wheels mesh, a second planet gear train comprising said central pinion, a set of planet wheels of said second train meshing with said central pinion and rotatable respectively on the same axles as the planet wheels of said first set, an outer crown wheel of said second train co-axial with said pinion and toothed internally with which said second set of planet wheels mesh, said second outer crown wheel being supported for slight rotational movement thereof on its axis relative to said fixed first crown wheel, a planet wheel carrier rotatable on an axis and supporting the common axles of said two sets of planet wheels and operatively connected to said spindle for effecting rotation of said spindle upon rotation of said carrier, and a pusher pawl in engagement with the toothed crown wheel of said second planet gear train and biased in a direction to produce said slight rotational movement of the toothed crown wheel of said second planet gear train in the direction opposite to that which would effect rotation of said spindle in a selected direction effected by rotation of said pinion.

2. Device for driving the spindle of a machine tool as defined in claim 1, the number of teeth of each of said outer crown wheels being prime to the number of teeth of the planet wheels of the respective trains, said common axles respectively carrying a planet wheel of each set of planet wheels being distributed in irregular angular relation to each other about the axis of the central pinion.

3. Device for driving the spindle of a machine supported for rotation thereof on its axis which comprises a planet wheel carrier supported for rotation thereof on an axis and operatively connected to said spindle for effecting rotation of said spindle upon rotation of said planet wheel carrier, a pinion, means for supporting said pinion for rotation thereof on its axis, a first planet wheel supported by said planet wheel carrier for rotation of said planet wheel on the axis of said planet wheel and meshing with said pinion, a first crown wheel supported in fixed relation to said pinion supporting means, said planet wheel meshing with said crown wheel, a second planet wheel supported by said planet wheel carrier for rotation of said second planet wheel on its axis and meshing with said pinion, a second crown wheel supported for slight rotational movement of said second crown wheel relative to said pinion supporting means, said second planet wheel meshing with said second crown wheel, a pusher pawl in engagement with said second crown wheel and supported for slight movement of said pawl concomitantly with said slight rotational movement of said second crown wheel, means operatively connectible to said pusher pawl for biasing said pawl to effect said slight movement of said second crown wheel in a given direction of rotation thereof and opposite to the direction of rotation of said second crown wheel which would drive said second planet wheel and said planet wheel carrier in a direction for effecting rotation of said spindle in a selected direction, and driving means operatively connected to said pinion for effecting rotation of said pinion and rotation of said first planet wheel on its axis and rotation of said planet wheel carrier on its axis for effecting rotation of said spindle in said selected direction.

4. A device for driving the spindle of a machine as defined in claim 3 which comprises a second means operatively connectible to said pusher pawl for biasing said pusher pawl to effect said slight movement of said second crown wheel in the direction opposite to said given direction of rotation thereof, and means operable for selectively establishing the operative connections of said biasing means for effecting said slight movement of said second crown wheel selectively in said given and opposite directions corresponding to selected directions of rotation of said spindle.

5. Device for driving the spindle of a machine as defined in claim 3, in which the number of teeth of at least said first crown wheel is prime to the number of teeth of the planet wheel meshing therewith.

6. Device for driving the spindle of a machine as defined in claim 3, which comprises a plurality of said first planet wheels supported by said planet wheel carrier for rotation on their respective axes and meshing with said pinion and meshing with said first crown wheel, the axes of said planet wheels being disposed about the axis of said planet wheel carrier in unequal angularly spaced relation to each other.

7. Device for driving the spindle of a machine tool as defined in claim 1 which comprises a fly wheel element rotatably driven by said driving shaft and operatively connected to said pinion for rotation of said pinion concomitantly with rotation of said fly wheel element.

References Cited in the file of this patent
UNITED STATES PATENTS

| | | |
|---|---|---|
| 2,134,420 | Smith | Oct. 25, 1938 |
| 2,247,839 | Halford et al. | July 1, 1941 |
| 2,258,949 | Gartin | Oct. 14, 1941 |
| 2,407,975 | Christian | Sept. 24, 1946 |